United States Patent [19]

Keene et al.

[11] Patent Number: 4,912,173

[45] Date of Patent: * Mar. 27, 1990

[54] HYDROLYSIS OF POLY(ACETOXYSTYRENE) IN AQUEOUS SUSPENSION

[75] Inventors: Donna L. Keene; Dung Q. Tran, both of Corpus Christi, Tex.

[73] Assignee: Hoechst Celanese Corporation, Sommerville, N.J.

[*] Notice: The portion of the term of this patent subsequent to Jul. 7, 2004 has been disclaimed.

[21] Appl. No.: 115,128

[22] Filed: Oct. 30, 1987

[51] Int. Cl.$^4$ .................................................. C08F 8/12
[52] U.S. Cl. .................................. 525/378; 525/328.9; 525/379
[58] Field of Search ................................. 525/378, 379

[56] References Cited

U.S. PATENT DOCUMENTS 4,678,843 7/1987 Elmore et al. .................. 525/329.5

Primary Examiner—Bernard Lipman
Attorney, Agent, or Firm—Donald R. Cassady

[57] ABSTRACT

Polymers of 4-acetoxystyrene in finely divided particulate form are suspended in water, and while in suspension are hydrolyzed to polymers of 4-hydroxystyrene using aqueous nitrogen bases. Such polymers are useful in photoresists, as protective coatings for metal, in the manufacture of epoxy resins and epoxy resin curing agents.

23 Claims, No Drawings

HYDROLYSIS OF POLY(ACETOXYSTYRENE) IN AQUEOUS SUSPENSION

BACKGROUND OF INVENTION

The field of art to which this invention pertains is homopolymers of 4-hydroxystyrene.

Homopolymers and copolymers of 4-hydroxystyrene, or p-vinylphenol as it is also called, are known compositions which have been used, for example, in the manufacture of metal treatment compositions, photoresists, epoxy resins and epoxy resin curing agents. Polymers of 4-hydroxystyrene can be made by polymerizing 4-hydroxystyrene itself. However, 4-hydroxystyrene is an unstable compound and must be refrigerated to prevent it from polymerizing spontaneously. Even under refrigeration, the monomer will slowly polymerize to low molecular weight polymers. 4-Acetoxystyrene, the acetic acid ester of 4-hydroxystyrene, is a stable monomer which can be readily homopolymerized and copolymerized to low, medium and high molecular weight polymers. After polymerization, the phenolic ester group can be hydrolyzed to produce 4-hydroxystyrene polymers.

Corson et. al., Journal of Organic Chemistry, 23, 544–549 (1958), describe a 5 step process for making 4-hydroxystyrene from phenol. The phenol is first acetylated to 4-hydroxyacetophenone which is then acetylated to 4-acetoxyacetophenone. This compound is hydrogenated to 4-acetoxyphenylmethyl carbinol which is then dehydrated to 4-acetoxystyrene. The 4-acetoxystyrene is saponified to 4-hydroxystyrene using potassium hydroxide.

The ester interchange reaction of poly(4-acetoxystyrene) in methanol using sodium methylate is described in U.S. Pat. No. 2,276,138. About 84 percent of the acetate groups are removed by the interchange reaction. Packham, in the Journal of the Chemical Society, 1964, 2617–2624, describes the hydrolysis of crosslinked poly(4-hydroxystyrene) by refluxing the polymer in alkaline aqueous dioxane for 2 days. In U.S. Pat. No. 4,544,704, a copolymer of styrene and p-isopropenylphenylacetate is hydrolyzed with aqueous sodium hydroxide in methanol and toluene using a small amount of benzyltrimethylammonium chloride as a phase transfer agent. Arshady et. al., Journal of Polymer Science, 12, 2017–2025 (1974), hydrolyzed copolymers of styrene and acetoxystyrene to the vinylphenol polymer using hydrazine hydrate in dioxane.

In copending commonly assigned patent application Ser. No. 007,541, filed Jan. 28, 1987, now abandoned aqueous emulsions of polymers of 4-acetoxystyrene are hydrolyzed with a base to polymers of 4-hydroxystyrene.

In these prior art processes, the vinylphenol polymer is usually recovered as a solution. In order to obtain the polymer in solid form, it must be recovered from the solution by some means, such as by precipitation with a nonsolvent, acidification of the salt form of the polymer, spray drying, or the like. Such processes are time consuming and expensive, requiring additives and/or energy.

SUMMARY OF INVENTION

This invention is directed to a process for hydrolyzing homopolymers of 4-acetoxystyrene to homopolymers of 4-hydroxystyrene. In one aspect, the invention pertains to a process for hydrolyzing polymers of 4-acetoxystyrene in aqueous suspension to polymers of 4-hydroxystyrene. In another aspect, the invention relates to a process for hydrolyzing polymers of 4-acetoxystyrene in aqueous suspension with a nitrogen base and recovering the hydrolyzed polymers, i.e., the 4-hydroxystyrene polymers, from aqueous suspension.

By the process of this invention, homopolymers of 4-acetoxystyrene in particulate form are suspended in water and are then reacted with a nitrogen base in the amount of at least two moles of base for each equivalent of acetoxystyrene to be reacted in the polymer. The resulting 4-hydroxystyrene polymer in particulate form is then recovered from the aqueous suspension.

DESCRIPTION OF INVENTION

4-Acetoxystyrene will homopolymerize readily in the same manner that styrene homopolymerizes and can also be copolymerized with styrene and with monomers which are copolymerizable with styrene. Such polymers can be prepared in bulk, solution, aqueous emulsion, or aqueous suspension. Since the hydrolysis process of this invention is conducted on finely divided polymers in aqueous suspension, polymers prepared in solution or emulsion must first be isolated in solid form, must be ground to a small particle size and must then be suspended in water. Polymers obtained by bulk polymerization must be ground to small particle size and must be suspended in water. The preferred process for preparing the polymers to be used in this invention is the suspension polymerization process. In this process, the monomers, which must be substantially insoluble in water, are dispersed in water and are polymerized using a free radical producing catalyst which is soluble in the monomer phase, not the aqueous phase. The resulting polymers can then be hydrolyzed while in aqueous suspension, thus avoiding the steps of polymer isolation and grinding.

In carrying out the suspension polymerization process, which is also called pearl, bead or granular polymerization process, the 4-acetoxystyrene monomer is dispersed in water along with a suspending agent and a surface active agent. Suspending agents are water-soluble organic polymers (so-called protective colloids) and inorganic compounds in the form of water-insoluble powders. Examples of useful water-soluble organic polymers or protective colloids are ether linkage-containing protective colloids, such as methyl cellulose, hydroxyethyl cellulose, ethylhydroxyethyl cellulose, carboxymethyl cellulose, ethoxylated starch derivatives and the like. Other protective colloid substances can also be used either alone or together with the ether linkage containing materials. Other such protective colloids include partially and fully hydrolyzed polyvinyl alcohols, polyacrylic acid, sodium and other alkali metal polyacrylates, polyacrylamide, poly(methyl vinyl ether/maleic anhydride), polyvinylpyrrolidone, water soluble starch, glue, gelatin, water soluble alginates, such as algin, casein, agar and natural and synthetic gums, such as guar, gum arabic and gum tragacanth. The protective colloids can be used in the amounts ranging from about 0.005 weight percent to about 2 weight percent based on the total weight of the aqueous phase. Protective colloids increase the viscosity of the aqueous phase and reduce the tendency of the monomer droplets to coalesce.

Water-insoluble powders which also serve as suspending agents include kaolin, barium sulfate, talc, aluminum hydroxide, tricalcium phosphate, bentonite, titanium dioxide and the like. Such inorganic water-insoluble powders are used in the amounts of about 0.005 weight percent to about 0.5 weight percent based on the aqueous phase. Powders suspended in water are wetted by the aqueous phase. When two monomer droplets approach each other, their union may be prevented by the powder particles which lie between them.

Additions of surface active agents to the aqueous phase have great influence along with powders as suspending agents because of the reduction of surface tension. Very small additions of such surface active agents promotes the fine dispersion of the insoluble powder without changing the surface tension of the water very much. Because of the better dispersion of the suspending powders, smaller polymer granules are formed.

Surface active agents are helpful in reducing the interfacial tension so as to form fine droplets of monomers which results in finely dispersed polymer. However, too much surface active agent produces emulsions rather than dispersions. Addition of strongly dissociated inorganic salts, e.g., sodium sulfate, raises the surface tension of the water phase, thus compensating to some extent for the wetting action of the surface active agent. The amount of surface active agent will vary from about 0.001 weight percent to about 0.1 weight percent based on the aqueous phase. The strongly dissociated inorganic salt is used in the amount of about 0.5 to about 2 weight percent based on the weight of the aqueous phase.

Surface active agents which can be used in the suspension polymerization process are the well known nonionic and anionic surfactants. Examples of useful anionic surfactants are the higher molecular weight sulfates and sulfonates, e.g., sodium and potassium alkyl, aryl and alkylaryl sulfates and sulfonates, such as sodium nonyl sulfate, sodium undecyl sulfate, sodium tridecyl sulfate, sodium pentadecyl sulfate, sodium lauryl sulfate, sodium methyl benzene sulfate, potassium methyl benzene sulfonate, and sodium xylene sulfonate; higher fatter alcohols, e.g., stearyl, lauryl, etc., which have been ethoxylated and sulfonated; dialkyl esters of alkali metal sulfosuccinic acid salts, such as sodium diamyl sulfosuccinate, and sodium dioctyl sulfosuccinate; and formaldehyde-naphthalene sulfonic acid condensation products.

Examples of nonionic surfactants are polyethers, e.g., ethylene oxide and propylene oxide condensates which include straight and branched chain alkyl and alkylaryl polyethylene glycol and polypropylene glycol ethers and thioethers; alkylphenoxypoly(ethyleneoxy)ethanols having alkyl groups containing from about 7 to about 18 carbon atoms and having from about 4 to about 240 ethyleneoxy units, such as heptylphenoxypoly(ethyleneoxy)ethanols, nonylphenoxypoly(ethyleneoxy)ethanols and dodecylphenoxypoly(ethyleneoxy)ethanols; the polyoxyalkylene derivatives of hexitol (including sorbitans, sorbides, mannitans and mannides); partial long chain fatty acid esters, such as the polyoxyalkylene derivatives of sorbitan monolaurate, sorbitan monopalmitate, sorbitan monostearate, sorbitan tristearate, sorbitan monooleate and sorbitan trioleate; the condensates of ethylene oxide with a hydrophobic base, said base being formed by condensing propylene oxide with propylene glycol; sulfur containing condensates, e.g., those prepared by condensing ethylene oxide with higher alkyl mercaptans, such as nonyl, dodecyl or tetradecyl mercaptan, or with alkylthiophenols wherein the alkyl group contains from about 6 to about 15 carbon atoms; ethylene oxide derivatives of long chain carboxylic acids, such as lauric, myristic, palmitic, or oleic acids or mixtures of acids, such as tall oil fatty acids; and ethylene oxide derivatives of long chain alcohols such as octyl, decyl, lauryl, or cetyl alcohols.

The free radical producing catalysts used in preparing the suspension polymers are those which are soluble in the monomer phase and not soluble or sparingly soluble in the aqueous phase. Examples of such catalyst are benzoyl peroxide, tolyl peroxide, lauroyl peroxide, o-chlorobenzoyl peroxide, azobisisobutyronitrile, alpha,alpha'-azodicyclohexanecarbonitrile, azobis-alpha, gamma-dimethylvaleronitrile, and the like.

The amount of polymerization catalyst employed will be no more than that required to obtain substantially complete monomer conversion at lower catalyst cost. The amount of catalyst will generally vary from about 0.1 to about 4.5 weight percent based on the weight of the monomer.

The suspension polymerization process is usually conducted by adding all of the reactants to the reactor and the polymerization is conducted with sufficient agitation to form a fine suspension of monomer at a temperature of about 30° to about 95° C. until the polymerization is completed.

The particle size of the suspension polymers used in this invention will vary from about 10 micrometers to about 2 millimeters and preferably from about 100 micrometers to about 1 millimeter.

The process of this invention is conducted using 4-acetoxystyrene polymer suspended in water in the amount of about 15 to about 40 weight percent polymer based on the total suspension and, preferably, about 20 to about 30 weight percent.

The nitrogen bases used in this invention to catalyze the hydrolysis of the acetoxy groups to phenolic groups are ammonia, water soluble amines and water soluble quaternary ammonium hydroxides.

Ammonia is preferably used as ammonium hydroxide, i.e., as an aqueous solution of ammonia at a concentration of about 10 weight percent ammonia in water up to about 30 weight percent. Preferably, the solution will contain about 25 to about 30 weight percent ammonia. Ammonia can also be used in gaseous form. When used as a gas, it is preferably introduced into the reactor as a sparge below the surface of the aqueous reaction medium.

The amines useful in this invention are primary, secondary and tertiary water soluble amines. Such amines include primary amines which contain one to five carbon atoms, examples of which are methylamine, ethylamine and the primary propylamines butylamines and amylamines. Also included are secondary amines which contain two to eight carbon atoms, examples of which are dimethylamine, diethylamine, the dipropylamines, the dibutylamines, methylethylamine, methylpropylamine and the like. Tertiaryamines useful in this invention are those which contain three to six carbon atoms namely trimethylamine, triethylamine, dimethylethylamine and the like. Also included among the useful water soluble amines are the alkanolamines, i.e., primary, secondary and tertiary amines which contain from two to nine carbon atoms and one to three hydroxyl groups, examples of which are ethanolamine, methylethanolamine, dimethylethanolamine, diethanolamine, methyldiethanolamine, triethanolamine, propanolamine, dipropanolamine, tripropanolamine and the like.

Other useful nitrogen bases are water soluble quaternary ammonium hydroxides which contain four to about 12 carbon atoms per molecule. Examples of such bases include tetramethylammonium hydroxide, tetraethylammonium hydroxide, ethyltrimethylammonium hydroxide and the like.

The preferred nitrogen base for use in this process of this invention is ammonium hydroxide.

The amount of nitrogen base which is used to carry out the hydrolysis of acetoxy groups to phenolic groups is at least about two moles of base for each equivalent of acetoxy group that is to be hydrolyzed. If complete hydrolysis is desired, then at least two moles of nitrogen base are added for each molar equivalent of 4-acetoxystyrene in the suspension polymer. If less than complete hydrolysis is desired, then less nitrogen base is used but still on the basis of two equivalents for each equivalent of 4-acetoxystyrene to be hydrolyzed.

After adding the nitrogen base, the suspension is heated at about 30° C. to about 95° C., preferably about 60° C. to about 90° C., until the desired amount of hydrolysis is obtained. Generally, the time required will be about two hours to about 10 hours.

During the hydrolysis reaction when using ammonium hydroxide as the base, the suspended polymer remains in suspension in solid finely divided form. Surprisingly, the hydrolysis reaction takes place not only on the surface of the particle but within the particle. When the hydrolysis reaction is completed, the water is removed by decantation, filtration or centrifugation. After washing and drying, the polymer is ready for use.

When other bases, i.e., amines or quaternary ammonium hydroxides, are used, the suspended particles are sometimes softened or solubilized due to plasticization or neutralization. Agglomerated polymers can be recovered by removing the water, washing and drying as described above. Solubilized polymers are recovered after precipitation with acid.

The following examples explain the invention in more detail. Parts and percentages are parts and percentages by weight unless otherwise indicated.

EXAMPLE 1

To a suitable reactor are added 11,500 parts of deionized water containing dissolved therein 0.02 percent sodium lauryl sulfate, 0.49 percent polyvinylpyrrolidone and 0.98 percent sodium sulfate, 3500 parts of 4-acetoxystyrene and 40 parts of benzoyl peroxide. Agitation is begun (200 RPM) and heat is applied raising the temperature to 80° C. The temperature is gradually raised to 94° C. over a period of 4 hours and 30 minutes. Heating at 94° C. is continued for 18 hours. The resulting polymer has a molecular weight of 15,600 ($M_w$) and 5,600 ($M_n$).

To the aqueous suspension of poly(4-acetoxystyrene) are added 2850 parts of aqueous ammonium hydroxide (30 percent ammonia). The temperature is raised to 85° C. and is held at 85° C. for 6 hours. During this heating period, no change in the particles of polymer is detected. At the end of the heating period, the suspension is filtered to recover the solid finely divided polymer which is washed several times with deionized water. The polymer is substantially completely hydrolyzed poly(4-hydroxystyrene) as determined by infrared analysis.

EXAMPLE 2

To a suitable reactor are added 11,500 parts of deionized water containing 0.02 percent sodium lauryl sulfate, 0.49 percent polyvinylpyrrolidone and 0.98 percent sodium sulfate, 3510 parts of 4-acetoxystyrene and 5 parts of benzoyl peroxide. Agitation is begun (200 RPM) and heat is applied raising the temperature to 85°–86° C. for about 24 hours. The resulting poly(4-acetoxystyrene) has a molecular weight of 325,000 ($M_w$) and 236,000 ($M_n$).

To the aqueous suspension of poly(4-acetoxystyrene) are added 2850 parts of aqueous ammonium hydroxide (30 percent ammonia). The reactants are heated at 85° C. for 4 hours and 10 minutes. The solid polymer is recovered by filtration and is washed several times on the filter with deionized water. The polymer is then dried in a vacuum oven. The resulting polymer is substantially completely hydrolyzed poly(4-hydroxystyrene) as determined by infrared analysis.

EXAMPLE 3

To a suitable reactor are added 1148 parts of deionized water, 0.23 part of sodium lauryl sulfate, 5.64 parts of polyvinylpyrrolidone and 11.27 parts of sodium sulfate. Benzoyl peroxide, 4 parts, is dissolved in 350 parts of 4-acetoxystyrene and the solution is added to the reactor. The agitation is set at 200 RPM and heat is applied raising the temperature to 84° C. After one hour at this temperature, the temperature is raised to 93° C. in one hour and is held at 92°–94° C. for 20 hours. The temperature is then lowered to room temperature and a small amount of agglomerated solids is removed. The resulting aqueous suspension of poly(4-acetoxystyrene) has a solids content of 21.5 percent. The poly(4-acetoxystyrene) has a molecular weight of 54,600 ($M_w$) and 29,600 ($M_n$).

To 100 parts of the aqueous poly(4-acetoxystyrene) polymer are added 26.86 parts of triethylamine. The temperature is raised to 79.2° C. and is held at this temperature for 22 hours. After cooling, water is removed from the agglomerated polymer by decantation and filtration followed by drying under vacuum. A portion of the polymer is dissolved in tetrahydrofuran and the solution is filtered through glass wool. Infrared analysis shows the polymer to be poly(4-hydroxystyrene).

EXAMPLE 4

To 100 parts of the aqueous poly(4-acetoxystyrene) suspension prepared in Example 3 are added 15.69 parts of propylamine. After heating for 2.5 hours at 65°–71° C., the solid agglomerated polymer after removal of water by filtration and vacuum drying is substantially poly(4-hydroxystyrene) as determined by infrared analysis.

EXAMPLE 5

To 100 parts of the aqueous poly(4-acetoxystyrene) suspension prepared in Example 3 are added 19.41 parts of diethylamine. After heating for one hour and 45 minutes at 66°–81° C., the solid agglomerated polymer is found to be substantially poly(4-hydroxystyrene) as determined by infrared analysis.

EXAMPLE 6

To 100 parts of the aqueous poly(4-acetoxystyrene) suspension prepared in Example 3 are added 121 parts of a solution of 20 weight percent tetramethylammonium hydroxide in methanol. After heating for 1.5 hours at 77° to 78° C., a clear yellow solution is formed. To the solution are added dropwise 7.97 parts of acetic acid in 40 parts of deionized water. The polymer precipitates from solution in beads the size of the droplets of acid. The precipitated polymer is washed twice with 200 parts of water. The polymer is then ground to a fine powder and is washed 4 times with 200 parts of water. After drying overnight at 50° C., the polymer is substantially poly(4-hydroxystyrene) as determined by infrared analysis.

The principles, preferred embodiments and modes of operation of the present invention have been described in the foregoing specification. The invention which is intended to be protected herein, however, is not to be construed as limited to the particular forms disclosed, since these are to be regarded as illustrating rather than restrictive. Variations and changes may be made by those skilled in the art without departing from the spirit of the invention.

What is claimed:

1. A process for hydrolyzing polymers of 4-acetoxystyrene which comprises:
   (a) suspending the polymer in finely divided particulate form in water;
   (b) reacting the polymer with a nitrogen base in the amount of at least about 2 moles of nitrogen base for each equivalent of acetoxy group to be hydrolyzed; and
   (c) recovering the 4-hydroxystyrene polymer.

2. The process of claim 1 wherein the reaction is conducted at a temperature of about 30° C. to about 95° C.

3. The process of claim 1 wherein the reaction is conducted at a temperature of about 60° C. to about 90° C.

4. The process of claim 1 wherein the polymer has a particle size of about 10 micrometers to about 2 millimeters.

5. The process of claim 4 wherein the polymer has a particle size of about 100 micrometers to about 1 millimeter.

6. The process of claim 1 wherein the nitrogen base is ammonia.

7. The process of claim 6 wherein the ammonia is in the form of ammonium hydroxide.

8. The process of claim 1 wherein the nitrogen base is a water soluble amine.

9. The process of claim 8 wherein the water soluble amine is a primary amine.

10. The process of claim 9 wherein the primary amine is n-propylamine.

11. The process of claim 8 wherein the water soluble amine is a secondary amine.

12. The process of claim 11 wherein the secondary amine is diethylamine.

13. The process of claim 8 wherein the water soluble amine is a tertiary amine.

14. The process of claim 13 wherein the tertiary amine is triethylamine.

15. The process of claim 8 wherein the nitrogen base is a quaternary ammonium hydroxide.

16. The process of claim 15 wherein the quaternary ammonium hydroxide is tetramethylammonium hydroxide.

17. A process for hydrolyzing homopolymers of 4-acetoxystyrene which comprises:
    (a) suspending the polymer in finely divided particulate form in water;
    (b) reacting the polymer with ammonia in the amount of at least 2 moles of ammonia for each equivalent of acetoxy group to be hydrolyzed; and
    (c) recovering the 4-hydroxystyrene polymer in finely divided particulate form from the aqueous suspension.

18. The process of claim 17 wherein the reaction is conducted at a temperature of about 30° C. to about 95° C.

19. The process of claim 18 wherein the reaction is conducted at a temperature of about 60° C. to about 90° C.

20. The process of claim 17 wherein the polymer has a particle size of about 10 micrometers to about 2 millimeters.

21. The process of claim 20 wherein the polymer has a particle size of about 100 micrometers to about 1 millimeter.

22. The process of claim 17 wherein the ammonia is gaseous ammonia.

23. The process of claim 17 wherein the ammonia is ammonium hydroxide.

* * * * *